United States Patent [19]

Ward

[11] Patent Number: 4,600,498

[45] Date of Patent: * Jul. 15, 1986

[54] MILD HYDROCRACKING WITH A ZEOLITE CATALYST CONTAINING SILICA-ALUMINA

[75] Inventor: John W. Ward, Yorba Linda, Calif.

[73] Assignee: Union Oil Company of California, Los Angeles, Calif.

[ * ] Notice: The portion of the term of this patent subsequent to Dec. 6, 2000 has been disclaimed.

[21] Appl. No.: 715,510

[22] Filed: Mar. 22, 1985

Related U.S. Application Data

[60] Continuation-in-part of Ser. No. 531,924, Sep. 13, 1983, Pat. No. 4,517,074, which is a division of Ser. No. 84,761, Oct. 15, 1979, Pat. No. 4,419,271.

[51] Int. Cl.$^4$ .................. C10G 47/18; C10G 47/20
[52] U.S. Cl. ............................ 208/111; 208/216 R; 208/254 H
[58] Field of Search .............. 208/111, 254 H, 216 R, 208/89, 97

[56] References Cited

U.S. PATENT DOCUMENTS

| | | | |
|---|---|---|---|
| 3,132,089 | 5/1964 | Hass et al. | 208/89 |
| 3,312,615 | 4/1967 | Cramer et al. | 208/120 |
| 3,542,670 | 11/1970 | Erickson et al. | 208/120 |
| 3,617,483 | 11/1971 | Child et al. | 208/59 |
| 3,726,790 | 4/1973 | Gallagher et al. | 208/111 |
| 3,729,521 | 4/1973 | Gutberlet et al. | 585/475 |
| 3,781,199 | 12/1973 | Ward | 208/89 |
| 3,783,124 | 1/1974 | Rubin et al. | 208/111 |
| 3,835,027 | 9/1974 | Ward | 208/111 |
| 3,838,040 | 9/1974 | Ward | 208/111 |
| 3,853,742 | 12/1974 | Ward | 208/111 |
| 3,897,327 | 7/1975 | Ward | 208/111 |
| 3,909,450 | 9/1975 | O'Hara | 208/111 |
| 3,926,780 | 12/1975 | Ward | 208/111 |
| 3,929,672 | 12/1975 | Ward | 502/79 |
| 3,945,943 | 3/1976 | Ward | 502/79 |
| 3,997,618 | 12/1976 | Cornely et al. | 585/481 |
| 4,060,480 | 11/1977 | Reed et al. | 208/111 |
| 4,062,809 | 12/1977 | Ward | 502/219 |
| 4,085,068 | 4/1978 | Gallagher et al. | 502/255 |
| 4,097,365 | 6/1978 | Ward | 208/111 |
| 4,115,248 | 9/1978 | Mulaskey | 208/112 |
| 4,120,825 | 10/1978 | Ward | 502/64 |
| 4,121,996 | 10/1978 | Hilfman | 208/111 |
| 4,179,356 | 12/1979 | O'Hara et al. | 208/111 |
| 4,182,693 | 1/1980 | Gladrow | 208/120 |
| 4,193,454 | 3/1980 | Goldstein | 208/120 |
| 4,238,316 | 12/1980 | Mooi et al. | 208/58 |
| 4,309,277 | 1/1982 | O'Hara et al. | 208/111 |
| 4,326,947 | 4/1982 | Sawyer et al. | 208/111 |
| 4,376,039 | 3/1983 | Gladrow et al. | 208/120 |
| 4,400,571 | 8/1983 | Robinson | 208/111 |
| 4,419,271 | 12/1983 | Ward | 502/65 |
| 4,517,074 | 5/1985 | Ward | 208/111 |

*Primary Examiner*—Andrew H. Metz
*Assistant Examiner*—O. Chaudhuri
*Attorney, Agent, or Firm*—Dean Sandford; Gregory F. Wirzbicki; Alan H. Thompson

[57] ABSTRACT

A catalyst containing hydrogenation metals supported on a base having (1) a crystalline aluminosilicate zeolite having activity for cracking and (2) a dispersion of silica-alumina in an alumina matrix is employed to mildly hydrocrack a hydrocarbon oil.

34 Claims, No Drawings

MILD HYDROCRACKING WITH A ZEOLITE CATALYST CONTAINING SILICA-ALUMINA

CROSS REFERENCE TO RELATED APPLICATIONS

This application is a continuation-in-part of U.S. Application Ser. No. 531,924 filed Sept. 13, 1983, now U.S. Pat. No. 4,517,074 which is a divisional application of U.S. Ser. No. 84,761 filed Oct. 15, 1979 and now U.S. Pat. No. 4,419,271.

BACKGROUND OF THE INVENTION

The invention relates to a process for mild hydrocracking hydrocarbon oils. More particularly, the invention relates to a catalytic process for increasing the yield of distillate products from vacuum gas oils and residuum hydrocarbon feedstocks.

In the refining of hydrocarbon oils, it is often desirable to subject the hydrocarbon oil to catalytic hydroprocessing. During hydroprocessing, particulate catalysts are utilized to promote reactions such as hydrocracking, hydrodesulfurization, hydrodenitrogenation, hydrodemetallization, and/or conversion of asphaltene compounds. One or more of such reactions may occur during hydroprocessing by contacting a particulate catalyst with a feedstock, such as a residual petroleum oil fraction or a vacuum gas oil, under conditions of elevated temperature and pressure and in the presence of hydrogen. For example, the sulfur components in the feedstock may be converted to hydrogen sulfide, nitrogen components to ammonia, asphaltenes to molecules having increased hydrogen to carbon (H-C) ratios, higher molecular weight hydrocarbons to lower molecular weight hydrocarbons and contaminant metal components to components capable of being deposited on the catalyst. Hydrocracking is typically employed in the conversion of higher molecular weight hydrocarbons to lower molecular weight hydrocarbons to convert portions of a feedstock to lighter middle distillate products, such as gasoline and diesel oils.

Refiners of hydrocarbon oils are continually challenged to convert a greater portion of the oil into lighter middle distillate products. A number of conventional conversion processes are commonly used to tackle the conversion problem. Such processes include fluid catalytic cracking, hydrocracking and coking, which all require high capital investments in the refineries, and their construction may take years to be accomplished. Because of such high costs, refiners are continually searching for conversion processes which may be utilized in existing refinery units. One such alternative process for increasing a refinery's capacity to convert feedstocks to middle distillate products is "mild hydrocracking" in existing refinery units. Such a process involves more severely catalytically hydroprocessing a feedstock to obtain increased percentages of middle distillate products while operating within the constraints of the existing refinery equipment. One of the challenges to the refiner is to discover a catalyst which will suitably perform within the design limits of the existing hydroprocessing unit. For example, a unit formerly used for vacuum gas oil desulfurization or residuum hydrodesulfurization (i.e. a unit formerly used for less than about 10 volume percent hydrocarbon conversion) must exhibit acceptable activity, selectivity and stability, under the limiting operating conditions of the existing unit.

Therefore, an aim of the art is to provide a mild hydrocracking catalyst having a high activity, selectivity and stability. Activity may be determined by comparing the temperature at which various catalyst must be utilized under otherwise constant mild hydrocracking conditions with the same feedstock so as to produce a given percentage (between 10 volume percent and 50 volume percent) of products boiling at or below 700° F. The lower activity temperature for a given catalyst, the more active such a catalyst is in relation to a catalyst of higher activity temperature. Alternatively, activity may be determined by comparing the percentages of products boiling at or below 700° F. when various catalysts are utilized under otherwise constant mild hydrocracking conditions with the same feedstock. The higher the percentage of 700° F.—minus product converted from the components in the feedstock boiling above 700° F. for a given catalyst, the more active such a catalyst is in relation to a catalyst yielding a lower percentage of 700° F.—minus product. Selectivity of a mild hydrocracking catalyst may be determined during the foregoing described activity test and is measured as that percentage fraction of the 700° F.—product boiling in the range of middle distillate or midbarrel products, i.e., 300° F.–700° F. Stability is a measure of how well a catalyst maintains its activity over an extended period when treating a given hydrocarbon feedstock under the conditions of the activity test. Stability (i.e., resistance to deactivation) is generally measured in terms of the change in temperature required per day to maintain a 40 volume percent or other given conversion (less than 50 volume percent). In general, a catalyst having higher activity requires milder conversion conditions. Milder conversion conditions require less energy to achieve the desired volume percent conversion, and catalyst life is extended.

A typical mild hydrocracking catalyst contains hydrogenation metals on a porous refractory oxide support. Hydrogenation metals usually include Group VIB and/or Group VIII active metal components supported on an amorphous refractory oxide support such as alumina. The catalyst may also contain one or more acidifying components. Despite the high mild hydrocracking activity of the catalysts of the prior art, catalysts of yet higher activity, selectivity, and stability are still being sought.

Accordingly, it is a major object of this invention to provide a mild hydrocracking process utilizing an active, stable and selective catalyst and more particularly to provide a mild hydrocracking process utilizing such a catalyst in existing refinery units to convert about 10 to about 50 volume percent of a hydrocarbon oil boiling above 700° F. to middle distillate oils boiling at or below 700° F.

Another object of the invention is to provide a process for removing organonitrogen and/or organosulfur compounds from a vacuum gas oil by contacting the oil with a stable catalyst while simultaneously converting about 10 to about 50 volume percent of the oil boiling above 700° F. to middle distillate oils boiling at or below 700° F.

These and other objects and advantages of the invention will become apparent from the following description.

SUMMARY OF THE INVENTION

The present invention relates to the mild hydrocracking of a hydrocarbon oil with a catalyst under conditions including a hydrogen pressure less than about 1,500 p.s.i.g. such as to yield about a 10 to about a 50 volume percent conversion of the hydrocarbon oil fraction boiling above 700° F. to hydrocarbon products boiling below 700° F. The catalyst employed in the present invention is described in U.S. Pat. No. 4,419,271 herein incorporated by reference, which catalyst is an improvement of the catalyst described in U.S. Pat. No. 4,097,365, herein incorporated by reference. The catalyst of U.S. Pat. No. 4,419,271 used in the present invention comprises at least one hydrogenation component on a support containing a crystalline aluminosilicate zeolite having cracking activity, such as hydrogen Y zeolite or rare earth-exchanged Y zeolite, in a dispersion of silica-alumina in an alumina matrix. In addition to having suitable activity for hydrodenitrogenation and hydrodesulfurization, the catalyst used in the process of the present invention has been found to have a superior activity and stability for mild hydrocracking in comparison to the catalyst described in U.S. Pat. No. 4,097,365. Furthermore, in contrast to the process employing the catalyst described in U.S. Pat. No. 4,419,271, the process of the present invention employs an active, yet stable catalyst and yields a 10 to 50 volume percent conversion under low hydrogen partial pressure conditions in the mild hydrocracking process. In the usual instance, the catalyst of the process of the present invention is more active and stable for mild hydrocracking than comparison catalysts having supports consisting essentially of an amorphous refractory oxide or supports containing no zeolite in the dispersion of silica-alumina in an alumina matrix.

In its broadest embodiment, the present invention provides a mild hydrocracking process promoted by a catalyst support comprising an intimate admixture of (1) a crystalline aluminosilicate zeolite having cracking activity and (2) a dispersion of silica-alumina in an alumina matrix.

DETAILED DESCRIPTION OF THE INVENTION

The invention is directed to a mild hydrocracking process promoted by a catalyst comprising an intimate composite of one or more hydrogenation components, a crystalline aluminosilicate zeolite having catalytic activity for cracking hydrocarbons, and a dispersion of silica-alumina in a matrix consisting essentially of alumina. Among the hydrogenation components useful in the invention are the metals, oxides, and sulfides of uranium, the Group VIII elements, and the Group VIB elements. The most suitable hydrogenation components are selected from the group consisting of the metals, oxides, and sulfides of platinum, palladium, cobalt, nickel, tungsten, chromium, and molybdenum. The preferred catalyst contains at least one Group VIII metal component, and at least one Group VIB metal component, with the most preferred combination being a nickel and/or cobalt component with a molybdenum and/or tungsten component.

The hydrogenation component or components are intimately composited on a base or support comprising a mixture of one or more crystalline aluminosilicate zeolites having cracking activity and a heterogeneous dispersion of finely divided silica-alumina in a matrix of alumina. The suitable zeolites for use herein include crystalline aluminosilicate molecular sieves having catalytic activity for cracking hydrocarbons. Many naturally-occurring and synthetic crystalline aluminosilicate zeolites known in the art are useful in the invention, including, for example, faujasite, mordenite, erionite, Zeolite Y, Zeolite X, Zeolite L, Zeolite Omega, Zeolite ZSM-4, and their modifications. These and other such zeolitic molecular sieves are known to have activity for cracking hydrocarbons when a substantial proportion of the ion exchange sites are occupied with hydrogen ions or multivalent metal-containing cations, particularly rare earth cations. Normally, crystalline aluminosilicate zeolites are obtained in the alkali metal form and as such are largely inactive for catalytically cracking hydrocarbons. To produce a zeolite having cracking activity, the alkali metals are usually replaced with multivalent metal-containing cations, hydrogen ions, or hydrogen ion precursors (e.g. ammonium ion). This replacement of cations is generally accomplished by ion exchange, a method well-known in the art wherein the zeolite in the sodium or other alkali metal form is contacted with an aqueous solution containing hydrogen ions, ammonium ions, rare earth ions, or other suitable cations. Replacing even a portion of the sodium ions produces a zeolite having some cracking activity, but reducing the alkali metal content to less than 5 weight percent, preferably to less than 1 weight percent, and most preferably to less than about 0.5 weight percent (calculated as the alkali metal oxides), results in a material having substantial cracking activity, with the activity varying according to the zeolite and the amount of alkali metals removed.

In addition to the zeolites referred to above, many other crystalline aluminosilicate zeolites in their non-alkali metal forms may be utilized in the catalyst support of the invention. Preferred zeolites contain at least 50 percent of their pore volume in pores of diameter greater than 8 angstroms, with Zeolite Y (and its modifications) in the hydrogen form or in other forms imparting cracking activity to the zeolite being preferred zeolites for use in the invention. Also preferred are zeolites that have been ion-exchanged with ammonium ions and then steam stabilized in accordance with the teachings of U.S. Pat. No. 3,929,672, herein incorporated by reference. Such zeolites are commercially available from Union Carbide, Linde Division under designations such as Y-82. Zeolites useful herein contain less than about 5.0 weight percent of alkali metal components, calculated as the oxides thereof, and have a unit cell size between about 24.40 and 24.64 angstroms. In the usual case, the zeolites are prepared by calcining an ammonium-exchanged zeolite Y containing between about 0.6 and about 5.0 weight percent of sodium, calculated as $Na_2O$, at a temperature from about 600° F. to about 1650° F. in contact with water vapor to reduce the unit cell size to between about 24.40 and about 24.64 angstroms. The calcined zeolite is further ammonium-exchanged such that the sodium content is reduced below 0.6 weight percent.

Another useful zeolite is a material known as LZ-10, also available from Union Carbide, Linde Division. Although LZ-10 is a proprietary material, it is known that LZ-10 is a modified Y zeolite having a silica to alumina ratio between about 3.5 and 4.0, a surface area between about 500 and 700 $m^2/gm$, a unit cell size between about 24.25 and 24.35 angstroms, water sorption capacity less than about 8 percent by weight of the zeolite (at 4.6 mm partial pressure of water vapor and 25° C.), and an ion-exchange capacity less than 20 percent of that of a sodium Y zeolite of comparable silica to alumina ratio. When used as a hydrocracking catalyst, LZ-10 is highly active and selective for midbarrel hydrocracking, especially when composited with alumina and suitable hydrogenation components.

The support material utilized in the invention usually comprises between 2 and about 80 percent by weight, preferably between about 10 and about 70 percent by weight, of a crystalline aluminosilicate zeolite such as Y-82. The support also comprises a substantial proportion of a heterogeneous dispersion of finely divided silica-alumina in an alumina matrix, with gamma alumina being the preferred matrix. Usually, the dispersion comprises at least 15 percent by weight of the support, with the preferred and most preferred proportions being in the respective ranges of 30 to 98 percent and 30 to 90 percent by weight of the support.

One convenient method of preparing the catalyst support herein is to comull an alumina hydrogel with a silica-alumina cogel in hydrous or dry form. The cogel is preferably homogeneous and may be prepared in a manner such as that described in U.S. Pat. No. 3,210,294. Alternatively, the alumina hydrogel may be comulled with a "graft copolymer" of silica and alumina that has been prepared, for example, by first impregnating a silica hydrogel with an alumina salt and then precipitating alumina gel in the pores of the silica hydrogel by contact with ammonium hydroxide. In the usual case, the cogel or copolymer (either of which usually comprises silica in a proportion by dry weight of 20 to 96 percent, preferably 50 to 90 percent) is mulled with the alumina hydrogel such that the cogel or copolymer comprises 5 to 75 percent by weight, preferably 20 to 65 percent by weight, of the mixture. The overall silica content of the resulting dispersion on a dry basis is usually between 1 and 72 weight percent, preferably between 5 and 60 weight percent.

The mulled mixture of alumina gel with either a silica-alumina cogel or a silica and alumina "graft copolymer" may be utilized in the gel form or may be dried and/or calcined prior to combination with the zeolite. In the preferred method of preparation, the cogel or copolymer is spray dried and then crushed to a powdered form, following which the powder is mulled with a zeolite powder containing hydrogen ions, hydrogen ion precursors, or multivalent metal-containing cations, the amounts of cogel or copolymer mulled with said zeolite being such that the support will ultimately contain zeolite and dispersion in the proportions set forth hereinbefore. If desired, a binder may also be incorporated into the mulling mixture, as also may one or more active metal hydrogenation components in forms such as ammonium heptamolybdate, nickel nitrate or chloride, ammonium metatungstate, cobalt nitrate or chloride, etc. After mulling, the mixture is extruded through a die having suitable openings therein, such as circular openings of diameters between about 1/32 and ⅛ inch. Preferably, however, the die has openings therein in the shape of polylobes, such as three-leaf clovers and symetrical or assymetrical quadalobes, so as to produce an extrudate material having a geometric surface to geometric volume ratio greater than that of a cylindrical extrudate. The extruded material is cut into lengths of about 1/32 to ¾ inch, preferably ¼ to TM inch, dried, and calcined at an elevated temperature.

If desired, hydrogenation components may be composited with the support by impregnation; that is, rather than comulling the hydrogenation components with the support materials, the zeolite and dispersion are mulled, extruded, out into appropriate lengths, and calcined. The resulting particles are then contacted with one or more solutions containing the desired hydrogenation components in dissolved form, and the composite particles thus prepared are dried and calcined to produce finished catalyst particles.

Usually, the finished catalyst contains at least about 0.5 weight percent of hydrogenation components, calculated as the metals. In the usual instance, wherein a Group VIII metal and a Group VIB metal component are utilized in combination, the finished catalyst contains between about 5 percent and 35 percent, preferably between about 10 and 30 percent by weight, calculated as the respective trioxides, of the Group VIB metal components and between about 2 percent and 15 percent, preferably between 3 and 10 percent by weight, calculated as the respective monoxides, of the Group VIII metal components.

If desired, a phosphorus component may also be incorporated in the catalyst by either comulling the support materials with phosphoric acid or including phosphoric acid in the impregnating solution. Usual and preferred proportions of phosphorus in the catalyst fall in the ranges of 1 to 10 weight percent and 3 to 8 weight percent, calculated as $P_2O_5$.

The hydrogenation components, which will largely be present in their oxide forms after calcination in air, may be converted to their sulfide forms, if desired, by contact at elevated temperature with a reducing atmosphere comprising hydrogen sulfide. More conveniently, the catalyst is sulfided in situ, i.e., by contact with a sulfur-containing feedstock to be catalytically converted to more valuable hydrocarbons in the mild hydrocracking process.

The foregoing described catalysts may be employed as either a fixed, slurried or fluidized bed (but most usually a fixed bed) of particulates in a suitable reactor vessel wherein a hydrocarbon oil to be treated is introduced and subjected to mild hydrocracking conditions including an elevated total pressure, temperature, and hydrogen partial pressure. Under such conditions, the hydrocarbon oil and catalyst are subjected to a hydrogen partial pressure usually less than 1,500 p.s.i.g. and frequently less than 1,200 p.s.i.g., at a space velocity usually less than 3.0 LHSV and often less than 1.0 LHSV, so as to effect the desired degree of hydrocracking, desulfurization, and denitrogenation. As used herein, mild hydrocracking conditions require the conversion of about 10 to about 50 and preferably 15 to about 35 volume percent of the feedstock hydrocarbons boiling above about 700° F. to products boiling at or below 700° F. from a single pass of a feedstock in contact with the catalyst. The selectivity of the catalyst is determined by the fraction of the 700° F.—minus product, which boils in the range from about 300° F. to about 700° F.

Contemplated for treatment by the process of the invention are hydrocarbon-containing oils, herein referred to generally as "hydrocarbon oils," including broadly all liquid and liquid/vapor hydrocarbon mixtures such as crude petroleum oils and synthetic crudes. Among the typical oils contemplated are top crudes, light and heavy atmospheric and vacuum distillate oils, shale oils, and oils from bituminous sands, coal compositions and the like. For use herein, typical hydrocarbon oils or mixtures thereof contain at least about 50 volume percent of components boiling above about 700° F. and/or a pour point usually greater than about 40° F.

Generally, a substantial proportion of the hydrocarbon oil (i.e., at least about 90 weight percent) treated by the process of the invention will boil at a temperature less than about 1,100° F., and preferably less than about 1,050° F., and usually in the range from about 100° F. to about 1,100° F., and frequently in the range from about 500° F. to about 1,100° F.

Although many hydrocarbon feedstocks containing undesirable proportions of sulfur and nitrogen may be treated by mild hydrocracking, the preferred hydrocarbon oils treated by the process of the invention are gas oils and vacuum gas oils and waxy shale oils usually boiling in the range between about 500° and 1,100° F. and often in the range between 600° F. and 1,100° F., with a substantial proportion, i.e., at least about 90 percent, boiling at a temperature less than about 1,100° F. Sulfur is usually present in such oils in a proportion exceeding 0.1 weight percent and often exceeding 1 weight percent, calculated as S. Frequently, the feedstock contains undesirable proportions of nitrogen, usually in a concentration greater than about 0.0025 weight percent and often between about 0.1 and 1.0 weight percent, calculated as N. The feedstock may contain waxy components, e.g., n-paraffins and isoparaffins, in amounts sufficient to yield pour points of at least about 30° F.

A hydroprocessing reactor useful in the mild hydrocracking process of the invention is ordinarily an existing reactor that is part of an existing hydroprocessing unit, or units, in a refinery. A preferred reactor is one formerly used for vacuum gas oil desulfurization. In the mild hydrocracking of such a gas oil, the catalyst is usually maintained as a fixed bed with the feedstock passing downwardly once therethrough, and the reactor is generally operated under conditions within the limits of the existing reactor design. In some instances, mild hydrocracking reactors may be added to the existing equipment, either in series or parallel to existing or modified existing reactors. Typical operating conditions that yield more than about a 10 volume percent conversion of the oil fraction boiling above 700° F. to liquid products boiling at or below 700° F. are shown in the following Table II.

TABLE II

| Operating Conditions | Suitable Range | Preferred Range |
|---|---|---|
| Temperature, °F. | 500–900 | 600–850 |
| Hydrogen Pressure, p.s.i.g. | 200–1,500 | 500–1,300 |
| Space Velocity, LHSV | 0.05–3.0 | 0.1–1.5 |
| Hydrogen Recycle Rate, scf/bbl | 500–15,000 | 1,000–10,000 |

The results obtained in the mild hydrocracking process of the invention depend upon the nature of the feedstock and the severity of the operating conditions. It is preferred that about 15 to about 30 volume percent of the hydrocarbon oil be converted, in a single pass, to liquid products boiling at or below 700° F., and at least about 85 volume percent of the 700° F.—minus fraction contain hydrocarbon products boiling in the midbarrel range from about 300° F. to about 700° F. In the case of hydrodewaxing, the pour point of the product is usually reduced to less than 30° F., and preferably less than 25° F.

The invention is further illustrated by the following examples which are illustrative of specific modes of practicing the invention and are not intended as limiting the scope of the invention defined by the appended claims.

EXAMPLE I

A catalyst, designated as catalyst X, is prepared in accordance with the invention.

Catalyst X is prepared as follows: A dispersion of silica alumina in alumina containing overall 48 weight percent of silica and 52 weight percent of alumina is prepared by mulling about 55 parts by dry weight of an approximately 75/25 silica-alumina graft copolymer ($Al_2O_3$ precipitated via aluminum sulfate into the pores of a preformed silica gel) with 45 parts by weight of hydrous alumina gel. The resulting dispersion of silica alumina in alumina is then mixed and mulled with a dry stabilized Y zeolite (prepared in accordance with the method described in U.S. Pat. No. 3,929,672 for Catalyst A in Example 16, but without adding palladium) and Catapal TM alumina. The dried composite is then remulled with water and extruded through a die producing 1/16 inch cross-section clover-leaf extruded matter, which, after being broken into extrudates of about 0.1 and 0.6 inch lengths, is oven dried at 110° C. for 2 hours and calcined at 900° F. for 2 hours. The resulting support particle extrudates contain 40 weight percent of the Y zeolite, 40 weight percent of the silica-alumina dispersed in alumina, and 20 weight percent of Catapal TM.

The zeolite/silica-alumina/alumina support particles are impregnated with a solution containing ammonium metatungstate and nickel nitrate. After impregnation, the catalyst is dried at 110° C. and calcined at 900° F. in flowing air. A final catalyst is produced having a nominal composition as follows: 24.0 weight percent of tungsten components, calculated as $WO_3$, 4.0 weight percent of nickel components, calculated as NiO, with the balance comprising the zeolite/silica-alumina/alumina support.

Catalyst X is tested under mild hydrocracking conditions to determine its hydrocracking activity and its denitrogenation and desulfurization activity against two comparison catalysts.

Catalyst Y is prepared in a similar manner as catalyst X, except no zeolite is interspersed with the silica-alumina dispersion in the alumina matrix. Catalyst Y has a nominal composition of 24.0 weight percent of tungsten components, calculated as $WO_3$, 4.0 weight percent of nickel components, calculated as NiO, and otherwise the same characteristics (including silica-alumina/alumina weight ratio in the support) as catalyst X.

Catalyst C is a commercially available catalyst useful for mild hydrocracking and contains about 20.0 weight percent of molybdenum components, calculated as $MoO_3$, about 5.0 weight percent of cobalt components, calculated as CoO, about 3.0 weight percent of phosphorus components, calculated as P, and the balance of gamma alumina. Catalyst X and the two comparison catalysts are each presulfided for about 16 to about 20 hours by contact with a gas consisting of 90 volume percent $H_2$ and 10 volume percent $H_2S$ flowing at 4.4 SCFH (one atmosphere pressure). The temperature during the presulfiding is initially at room temperature, is increased gradually until 700° F. is reached, and then lowered to 550° F., at which time the catalyst is contacted with the feedstock.

Catalyst X and comparison catalysts Y and C are tested at mild hydrocracking conditions to determine activity with a Light Arabian vacuum gas oil (VGO) feedstock having the characteristics shown in Table III below. Table IV also includes hydrodenitrogenation and hydrodesulfurization activity. The presulfided catalysts, X and the comparisons, are each charged in separate runs to a reactor and utilized at 710° F. for 3 days, at 735° F. for 2 days, and at 755° F. for the next 2 days to hydrocrack, hydrodesulfurize and hydrodenitrogenate the VGO feedstock under the following conditions: 1,000 p.s.i.g. total pressure, 1.0 LHSV and a hydrogen rate of 3,000 SCF/B.

TABLE III

| Feedstock Properties | |
|---|---|
| Feed Description | Light Arabian Vacuum Gas Oil |
| Gravity, °API | 22.3 |
| Sulfur, wt. % | 2.54 |
| Nitrogen, wt. % | 0.09 |
| Carbon Residue, D-189, wt. % | 0.42 |
| Pour Point, °F. | +95 |
| ASTM D-1160, Vol % | Distillation, °F. |
| IBP/5 | 623/700 |
| 10/20 | 737/776 |
| 30/40 | 810/837 |
| 50/60 | 860/898 |
| 70/80 | 928/968 |
| 90/95 | 1019/1056 |
| EP/% rec | 1103 |

A portion of the feedstock is passed downwardly through each reactor and contacted with the described catalysts in a single stage, single pass system with once-through hydrogen. The data relating to conversion of nitrogen and sulfur compounds and conversion to 700° F. minus products is summarized in Table IV.

TABLE IV

| Catalyst | Product Vol % Boiling at or Below 700° F. | | | Ratio of Vol. % Conversion at | Wt. % Product S | | | Wt. % Product N | | |
|---|---|---|---|---|---|---|---|---|---|---|
| Temp, °F. | 710 | 735 | 755 | 755° F./710° F. | 710 | 735 | 755 | 710 | 735 | 755 |
| X | 20.4 | — | 40.9 | 2.33 | .55 | — | .14 | — | — | .008 |
| Y | 19.0 | 25.3 | 33.5 | 2.03 | .210 | .054 | .015 | .025 | .012 | — |
| C | 18.9 | 22.6 | 29.6 | 1.77 | — | .023 | .0113 | .040 | .024 | .015 |

In view of the data in Table IV relative to conversion of the feedstock to products boiling at a temperature at or below 700° F., the process of the invention utilizing catalyst X exhibits noticeably higher yields of products boiling below 700° F. than the comparison catalysts at conversion temperatures of 710° and 755° F. At 755° F., the process utilizing catalyst X exhibits about 36 volume percent conversion of hydrocarbons boiling above about 700° F. to hydrocarbon products boiling below 700° F., and about 94 percent and 91 percent conversion of nitrogen and sulfur, respectively. At 710° F., the process utilizing catalyst X exhibits about 15 volume percent conversion. Also, over the 45° F. increase in temperature from 710° F. to 755° F., a 2.33-fold increase in volume percent conversion of 700° F. plus feedstock components to 700° F. minus products results. Such an improved conversion percentage is surprisingly higher than expected and indicates good resistance to deactivation (i.e., stability), and especially in comparison to the processes using catalyst Y and the commercial catalyst C.

While particular embodiments of the invention have been described, it will be understood, of course, that the invention is not limited thereto since many obvious modifications can be made, and it is intended to include within the invention any such modifications as will fall within the scope of the invention as defined by the appended claims.

I claim:

1. A process for mild hydrocracking a hydrocarbon oil having a substantial proportion of components boiling below about 1,100° F., said process comprising contacting said hydrocarbon oil under conditions of elevated temperature and a hydrogen pressure less than about 1,500 p.s.i.g. with a particulate catalyst comprising at least one hydrogenation component, a crystalline aluminosilicate zeolite having catalytic activity for cracking hydrocarbons, and a dispersion of silica-alumina in a matrix consisting essentially of alumina, said conditions being such as to yield about a 10 to about a 50 volume percent conversion of the hydrocarbon oil fraction boiling above 700° F. to hydrocarbon products boiling at or below 700° F.

2. The process defined in claim 1 wherein said hydrocarbon oil boils in the range from about 100° F. to about 1,100° F. and contains more than 50 volume percent of hydrocarbon components boiling above 700° F.

3. The process defined in claim 1 wherein said conditions comprise a hydrogen pressure less than about 1,200 p.s.i.g. and being such as to yield about a 15 to about a 35 volume percent conversion of said hydrocarbon oil boiling above 700° F. to hydrocarbon products boiling at or below 700° F.

4. The process defined in claim 1 wherein said hydrogenation component is selected from the group consisting of Group VIII and Group VIB metals, their oxides and sulfides.

5. The process defined in claim 1 wherein said hydrogen partial pressure is about 500 to about 1,300 p.s.i.g. and said conditions are such as to yield about a 15 to about a 35 volume percent conversion of said hydrocarbon oil to hydrocarbon products boiling at or below 700° F.

6. The process defined in claim 1 wherein the overall $SiO_2$ content in said dispersion is about 5 to about 60 weight percent.

7. The process defined in claim 1 wherein said hydrocarbon oil is selected from the group consisting of gas oils, vacuum gas oils, shale oils, top crudes, and oils from bituminous sands and coal compositions.

8. The process defined in claim 1 wherein said crystalline aluminosilicate zeolite contains less than about 0.6 weight percent alkali metal components, calculated as alkali metal oxides.

9. The process defined in claim 1 wherein said matrix consists essentially of gamma alumina.

10. The process defined in claim 1 wherein said zeolite contains cations selected from the group consisting of hydrogen ions and rare earth cations.

11. The process defined in claim 1 wherein said zeolite is selected from the group consisting of zeolite Y, zeolite L, zeolite Omega, zeolite X and mixtures thereof.

12. The process defined in claim 1 wherein said zeolite has a unit cell size between about 24.40 and about 24.64 angstroms.

13. The process defined in claim 1 further comprising simultaneous desulfurization of said hydrocarbon oil.

14. The process defined in claim 1 further comprising simultaneous denitrogenation of said hydrocarbon oil.

15. A process for mild hydrocracking a hydrocarbon gas oil, said process comprising contacting said hydrocarbon gas oil under conditions of elevated temperature and a hydrogen pressure less than about 1,500 p.s.i.g. with a particulate catalyst comprising at least one Group VIB metal component and at least one Group VIII metal component, a crystalline aluminosilicate zeolite containing less than about 5.0 weight percent of alkali metal components, calculated as the oxides thereof, and a dispersion of silica-alumina in a matrix consisting essentially of alumina, said conditions being such as to yield about a 10 to about a 50 volume percent conversion of the hydrocarbon oil fraction boiling above 700° F. to hydrocarbon products boiling at or below 700° F.

16. The process defined in claim 15 wherein said hydrocarbon gas oil boiling in the range from about 550° F. to about 1,100° F. and contains more than 50 volume percent of said hydrocarbon components boiling above 700° F.

17. The process defined in claim 15 wherein said conditions comprise a hydrogen pressure less than about 1,200 p.s.i.g. and being such as to yield about a 15 to about a 35 volume percent conversion of said hydrocarbon oil boiling above 700° F. to hydrocarbon products boiling at or below 700° F.

18. The process defined in claim 15 wherein said conditions are such as to yield about a 15 to about a 35 volume percent conversion of said hydrocarbon oil to hydrocarbon products boiling at or below 700° F.

19. The process defined in claim 15 wherein said hydrogenation component is selected from the group consisting of platinum, palladium, cobalt, nickel, tungsten, chromium, molybdenum, their oxides, and their sulfides.

20. The process defined in claim 15 wherein said zeolite is selected from the group consisting of zeolite Y, zeolite L, zeolite Omega, zeolite X and mixtures thereof.

21. The process defined in claim 15 wherein said zeolite has a unit cell size between about 24.40 and about 24.64 angstroms.

22. The process defined in claim 15 further comprising simultaneous desulfurization of said hydrocarbon gas oil.

23. The process defined in claim 15 further comprising simultaneous denitrogenation of said hydrocarbon gas oil.

24. A process for mild hydrocracking a hydrocarbon vacuum gas oil having a boiling range from about 600° F. to about 1,100° F. and containing more than 50 volume percent of hydrocarbon components boiling at greater than 700° F., said process comprising contacting said hydrocarbon vacuum gas oil under conditions including a temperature greater than about 600° F., a hydrogen pressure from about 500 p.s.i.g. to about 1,300 p.s.i.g., and a space velocity less than about 1.5 LHSV with a catalytic composition comprising a Group VIB or Group VIII hydrogenation component intimately composited with a zeolite-containing support, said support having been prepared by a method comprising the steps of:

(1) calcining an ammonium-exchange zeolite Y containing between about 0.6 and 5 weight percent sodium, calculated as $Na_2O$, at a temperature between about 600° F. and 1,650° F. in contact with water vapor for a sufficient time to substantially reduce the unit cell size of said zeolite and bring it to a value between about 24.40 and 24.64 angstroms;

(2) subjecting the calcined zeolite to further ammonium ion exchange under conditions such that the sodium content of the zeolite is reduced below about 0.6 weight percent, calculated as $Na_2O$; and (3) intimately admixing the zeolite obtained from step (2) with a dispersion of silica-alumina in a gamma alumina matrix and calcining the resulting admixture; and said conditions being such as to yield about a 15 to about a 35 volume percent conversion of said hydrocarbon oil boiling above 700° F. to hydrocarbon products boiling at or below 700° F.

25. The process defined in claim 24 wherein said dispersion consists essentially of silica-alumina containing between about 50 and 90 percent by weight silica dispersed in gamma alumina, the overall silica content of the dispersion being between about 20 and about 65 weight percent of silica-alumina.

26. The process defined in claim 24 wherein the overall $SiO_2$ content in said dispersion is about 5 to about 60 weight percent.

27. The process defined in claim 24 wherein said hydrocarbon vacuum gas oil contains at least about 0.1 weight percent of sulfur, calculated as S.

28. The process defined in claim 24 wherein said conditions being such as to yield about a 15 to about a 30 volume percent conversion of said hydrocarbon vacuum gas oil to hydrocarbon products boiling at or below 700° F.

29. The process defined in claim 24 wherein said hydrocarbon products contain at least 85 volume percent of liquid hydrocarbon products boiling in the range from about 300° F. to about 700° F.

30. The process defined in claim 24 wherein said hydrocarbon vacuum gas oil contains greater than about 0.0025 weight percent of nitrogen, calculated as N.

31. The process defined in claim 24 wherein said conditions are such as to yield greater than about 25 volume percent conversion of said hydrocarbon vacuum gas oil to hydrocarbon products boiling at or below 700° F.

32. The process defined in claim 24 wherein said contacting of said hydrocarbon vacuum gas oil with said catalyst occurs in a reactor formerly used for desulfurizing a vacuum gas oil.

33. The process defined in claim 24 further comprising simultaneous desulfurization of said hydrocarbon vacuum gas oil.

34. The process defined in claim 24 further comprising simultaneous denitrogenation of said hydrocarbon vacuum gas oil.

* * * * *